(12) United States Patent
Gaiter (10) Patent No.: US 11,657,566 B2
(45) Date of Patent: *May 23, 2023

(54) THREE-DIMENSIONAL LAYERED MAP (71) Applicant: KNOWROADS, LLC, Knoxville, TN (US)

(72) Inventor: Felix Ross Gaiter, Knoxville, TN (US)

(73) Assignee: Knowroads, LLC, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,723

(22) Filed: Aug. 2, 2021

(65) Prior Publication Data
US 2022/0020209 A1 Jan. 20, 2022

Related U.S. Application Data (63) Continuation of application No. 16/904,486, filed on Jun. 17, 2020, now Pat. No. 11,087,533, which is a continuation of application No. 16/162,385, filed on Oct. 17, 2018, now Pat. No. 10,726,615, which is a continuation of application No. 14/853,162, filed on
(Continued)

(51) Int. Cl.
G06T 17/05 (2011.01)
G01C 21/36 (2006.01)
G09B 29/12 (2006.01)
G06T 19/00 (2011.01)
(Continued)

(52) U.S. Cl.
CPC .......... *G06T 17/05* (2013.01); *G01C 21/3673* (2013.01); *G01C 21/3682* (2013.01); *G06T 15/04* (2013.01); *G06T 15/20* (2013.01); *G06T 19/00* (2013.01); *G09B 29/12* (2013.01); *G06T 2215/12* (2013.01)

(58) Field of Classification Search
CPC ......... G06T 17/05; G06T 15/04; G06T 15/20; G06T 19/00; G06T 2215/12; G01C 21/3673; G01C 21/3682; G09B 29/12
See application file for complete search history.

(56) References Cited

U.S. PATENT DOCUMENTS 6,035,255 A 3/2000 Murphy et al.
7,031,830 B2 * 4/2006 Kokojima .......... G01C 21/3638
345/419
(Continued)

FOREIGN PATENT DOCUMENTS

WO WO 2011/023416 A2 3/2011

OTHER PUBLICATIONS

University of Virginia, SketchUp Tutorials, 2008, http://www.arch.virginia.edu/computing/training/online/faculty/stiles/pages/sketchup%20new/sketchup%207_sandbox%20tools.html.
(Continued)

*Primary Examiner* — Abderrahim Merouan
(74) *Attorney, Agent, or Firm* — Sterne, Kessler, Goldstein & Fox P.L.L.C.

(57) ABSTRACT

A map having surfaces that are depicted at different levels that are not related to topography, with boundaries between the surfaces, where the boundaries are disposed at travel ways. The travel ways form cliff faces in the map between the surfaces, with information items disposed on the cliff faces at positions corresponding to items of interest at locations along the travel ways where the information items are disposed.

20 Claims, 8 Drawing Sheets

Related U.S. Application Data

Sep. 14, 2015, now Pat. No. 10,140,757, which is a continuation-in-part of application No. PCT/US2014/030170, filed on Mar. 17, 2014.

(60) Provisional application No. 61/788,963, filed on Mar. 15, 2013.

(51) Int. Cl.
    *G06T 15/04*      (2011.01)
    *G06T 15/20*      (2011.01)

(56) References Cited

U.S. PATENT DOCUMENTS

| | | | |
|---|---|---|---|
| 7,216,003 B2 | 5/2007 | Faulkner et al. | |
| 7,714,860 B2 | 5/2010 | Trotta et al. | |
| 7,933,897 B2* | 4/2011 | Jones | G06F 16/29 707/726 |
| 8,260,543 B2* | 9/2012 | Han | G01C 21/3697 701/428 |
| 8,560,600 B2* | 10/2013 | Maurer | G06F 16/29 709/203 |
| 8,984,099 B1* | 3/2015 | Giencke | H04L 67/42 709/219 |
| 9,015,014 B2 | 4/2015 | Laake et al. | |
| 10,140,757 B2 | 11/2018 | Gaiter | |
| 10,726,615 B2 | 7/2020 | Gaiter | |
| 11,087,533 B1 | 8/2021 | Gaiter | |
| 2003/0062674 A1* | 4/2003 | Logue | A63F 9/1288 273/156 |
| 2003/0151592 A1* | 8/2003 | Ritter | G01C 21/3682 345/156 |
| 2003/0198404 A1 | 10/2003 | Frisken et al. | |
| 2004/0027258 A1* | 2/2004 | Pechatnikov | G01C 21/3682 340/995.12 |
| 2005/0270311 A1* | 12/2005 | Rasmussen | G06T 11/40 345/677 |
| 2007/0143345 A1* | 6/2007 | Jones | G06F 16/288 |
| 2008/0198158 A1* | 8/2008 | Iwamura | G06T 15/20 345/419 |
| 2008/0249703 A1 | 10/2008 | Matsuno et al. | |
| 2008/0294393 A1 | 11/2008 | Laake et al. | |
| 2011/0096091 A1* | 4/2011 | Milewski | G09B 29/007 345/629 |
| 2012/0056899 A1* | 3/2012 | Stroila | G06T 17/05 345/634 |
| 2013/0120379 A1 | 5/2013 | Adair et al. | |
| 2013/0131978 A1* | 5/2013 | Han | G06T 17/05 701/436 |
| 2013/0325903 A1* | 12/2013 | Rohlf | G06F 16/9027 707/E17.044 |
| 2014/0125655 A1* | 5/2014 | Kunath | G01C 21/32 345/419 |
| 2015/0073711 A1* | 3/2015 | Brewington | G01V 11/00 702/5 |
| 2016/0005223 A1 | 1/2016 | Gaiter | |
| 2019/0333268 A1 | 10/2019 | Gaiter | |

OTHER PUBLICATIONS

International Search Report and Written Opinion of the International Searching Authority directed to related International Patent Application No. PCT/US2014/030170, dated Aug. 28, 2014; 6 pages.

* cited by examiner

THREE-DIMENSIONAL LAYERED MAP

CROSS REFERENCE TO RELATED APPLICATIONS

This application claims rights and priority from pending patent application Ser. No. 16/904,486 filed Jun. 17, 2020, which claims priority from U.S. Pat. No. 10,726,615, filed Oct. 17, 2018, which claims priority to U.S. Pat. No. 10,140,757, filed Sep. 14, 2015, which claims priority from PCT application PCT/US2014/030170 filed Mar. 17, 2014, which claims priority from U.S. Provisional Application No. 61/788,963, filed Mar. 15, 2013, the content of all of which are incorporated herein by reference.

FIELD

This disclosure relates to the field of maps. More particularly, this disclosure relates to a multi-tiered layered map having additional space for labeled features and points of interest.

Introduction

Maps are used for navigating and identifying points of interest, among other uses. When a point of interest is depicted on a map, a notation is often placed on the map, such as an identifying number or icon, which either indicates by itself the nature of the point of interest, or is associates the point of interest with a corresponding legend.

However, printing points of interest on the face of conventional two-dimensional maps takes up valuable space and obscures other areas of interest on the map. Additionally, only limited amounts of information may be labeled on a particular map before the area around the point of interest becomes too cluttered with notations.

What is needed, therefore, is a map that reduces issues such as those described above, at least in part.

SUMMARY

The above and other needs are met by a map having surfaces that are depicted at different levels that are not related to topography, with boundaries between the surfaces, where the boundaries are disposed at travel ways. The travel ways form cliff faces in the map between the surfaces, with information items disposed on the cliff faces at positions corresponding to items of interest at locations along the travel ways where the information items are disposed.

In various embodiments according to this aspect of the invention, the map is a two-dimensional representation of a three-dimensional structure. In other embodiments the map is formed as a three-dimensional structure. In some embodiments the travel ways include at least one of a road, path, trail, waterway, walkway, bus route, and train rail. In some embodiments the items of interest include at least one of a business, traffic condition, travel way condition, weather condition, construction, transit schedule, toll, fare, and scenic information at the corresponding position along the travel ways. In some embodiments the information items include at least one of text, audio, video, animation, fixed graphic, and icon. In some embodiments the cliff face is divided into rows and columns of information items. In some embodiments a valence is disposed along the cliff face, where substantially all of the valence is visible. In some embodiments the map is displayed on a computer monitor. In some embodiments the map is printed on paper. In some embodiments the map is displayed on a computer monitor and is interactive with a user who selects different travel ways on which to form boundaries and cliff faces. In some embodiments the information items are updated in real time.

According to another aspect of the invention there is described a processor-based system for producing a map. A processor retrieves map information, including travel ways and information items corresponding to items of interest along the travel ways. A memory stores the map information, and map positions of interest and travel ways of interest are selected with a user interface. A display presents the map positions of interest and travel ways of interest. The map has surfaces that are depicted at different levels that are not related to topography, with boundaries between the surfaces. The boundaries are disposed at the travel ways of interest, which form cliff faces in the map between the surfaces. The information items are disposed on the cliff faces at positions corresponding to locations along the travel ways of interest where the items of interest are located.

In various embodiments according to this aspect of the invention the travel ways include at least one of a road, path, trail, waterway, walkway, bus route, and train rail. In some embodiments the items of interest include at least one of a business, traffic condition, travel way condition, weather condition, construction, transit schedule, toll, fare, and scenic information at the corresponding position along the travel ways. In some embodiments the information items include at least one of text, audio, video, animation, fixed graphic, and icon. In some embodiments the information items are updated in real time.

According to yet another aspect of the invention there is described a processor-based method for producing a map, by retrieving with the processor map information, including travel ways and information items corresponding to items of interest along the travel ways. The map information is stored in a memory. Map positions of interest and travel ways of interest are selected from the memory, and presented. Surfaces of the map are depicted at different levels that are not related to topography, with boundaries between the surfaces. The boundaries are disposed at the travel ways of interest, which form cliff faces in the map between the surfaces. The information items are disposed on the cliff faces at positions corresponding to locations along the travel ways of interest where the items of interest are located.

In various embodiments according to this aspect of the invention, the travel ways include at least one of a road, path, trail, waterway, walkway, bus route, and train rail. In some embodiments the items of interest include at least one of a business, traffic condition, travel way condition, weather condition, construction, transit schedule, toll, fare, and scenic information at the corresponding position along the travel ways. In some embodiments the information items include at least one of text, audio, video, animation, fixed graphic, and icon. In some embodiments the information items are updated in real time.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
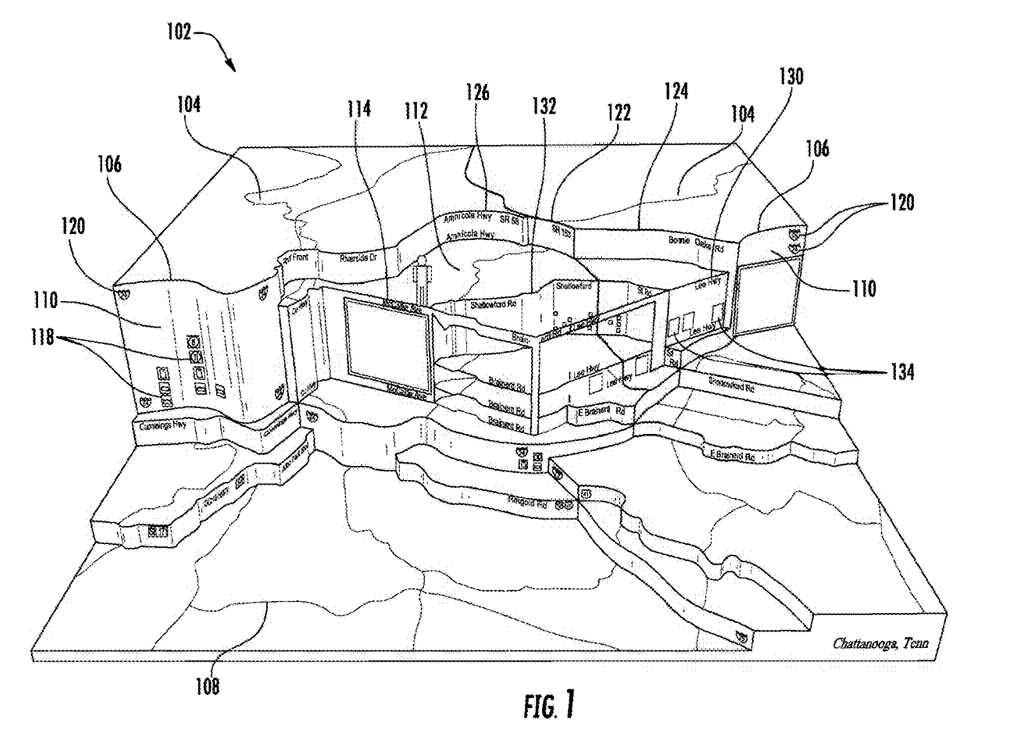
FIG. 1 is an illustration of a three-dimensional map according to a first embodiment of the disclosure.

With reference now to FIG. 1, there is depicted a three-dimensional layered map 102 according to an embodiment of the invention. In this embodiment, the layered map 102 is divided into multiple tiers or layers that are created along various geographical boundaries, routes, or roadways on the surface of the map. Each separately raised layer of the map creates a cliff face 110 that occupies a vertical space of different heights created between each layer. The height of each cliff face 110 can be adjusted to accommodate different amounts of informational content, such as that represented by text, numbers, icons, thumbnails, photos, video windows, and other graphic content containers or any combinations thereof.

It is appreciated that the map 102 of FIG. 1, and the other three-dimensional layered maps as depicted herein, are two-dimensional representations of three-dimensional constructs. The present invention contemplates such two-dimensional representations, such as might be depicted on a display, projected, or printed. However, the invention also contemplates actual three-dimensional maps, such as might be constructed of wood, plastic, or paper.

FIG. 1 illustrates a map of Chattanooga, Tenn., divided into various layers. A first layer 104 is created along a first route 106 of the map 102. A second layer 112 may be created along a second route 114, the second layer 112 having a border defined by the first route 106 and the second route 114. In this embodiment, the cliff face 110 is a direct representation of the roadway from which it was developed.

The height of each individual layer and associated cliff face 110 relative to a base layer 108 of the map 102 is based in one embodiment on the number of points of interest along the roadway that defines the cliff face 110 and the edge of the layer. For example, route 106 of FIG. 1 may represent an interstate highway having multiple exits with multiple points of interest at each exit. As such, the height of the first layer 104 corresponding to the first route 106 may be substantially higher than the second layer 112 that may represent a local highway having fewer points of interest.

As further shown in FIG. 1, the first layer 104 includes a first cliff face 110 occupying the vertical space between the first layer 104 and adjacent layers. The cliff face 110 may be populated with multiple notations 118 corresponding to various points of interest along the first route 106. The notations may be icons or symbols representing gas stations, restaurants, tourist attractions, as well as other points of interest, and may be displayed on the cliff face 110 at their representative geographical locations along the first route 106. Additionally, a cliff face may be populated with thumbnails 134 for the purpose of replacing text with digital images that visually describe points of interest along a particular route.

For example, if an exit along a major interstate highway includes service stations, lodging, and dining, notations 118 may be placed on the cliff face 110 such as icons indicating that the particular exit has these points of interest. By placing the notations 118 on the cliff face 110, a plurality of notations 118 may be placed at the proper location relative to the exit on the map 102 while allowing the surface of the map to remain substantially uncluttered and unobstructed by the notations 118. Further, by providing a taller cliff face 110 for routes that include large numbers of points of interest, more information may be provided within the vertical area of the cliff face than is ordinarily allowed on a conventional two-dimensional map in which notations are printed directly on the map face. By using the cliff face 110 to place the notations 118 along a route as opposed to using a map including a legend, a user of the map is able to readily identify the points of interest along the route without needing to refer to a separate legend, and advantageously, a user can access more information concerning a particular point of interest than typically can be accommodated on a conventional, two-dimensional map.

In more detail, still referring to the embodiment of FIG. 1, route identification data, such as interstate highway shields 120, state route numbers 122, and street names 124, may be displayed on the corresponding cliff face for easy use in navigation. For example, as illustrated in FIG. 1, a first cliff face 110 is created along a first route 106, which is identified directly on the cliff face as interstate highway 1-75/1-24 120. A branching cliff face is created along the route designated as Bonnie Oaks Rd. 124 and is shown as an exit off of interstate highway 1-75/1-24 120. The Bonnie Oaks Rd. cliff face 124 intersects with the cliff face created along SR 153 (designated as 122), which, in turn, intersects with the cliff face created along the route shown as Amnicola Hwy 126, also known as SR 58. As further shown in FIG. 1, a second layer 112 is partially created along the routes designated on the corresponding cliff faces as Lee Hwy 130, which intersects with Bonnie Oaks Rd. 124, and Shallowford Rd. 132, which intersects Lee Hwy 130.

Figure 2:
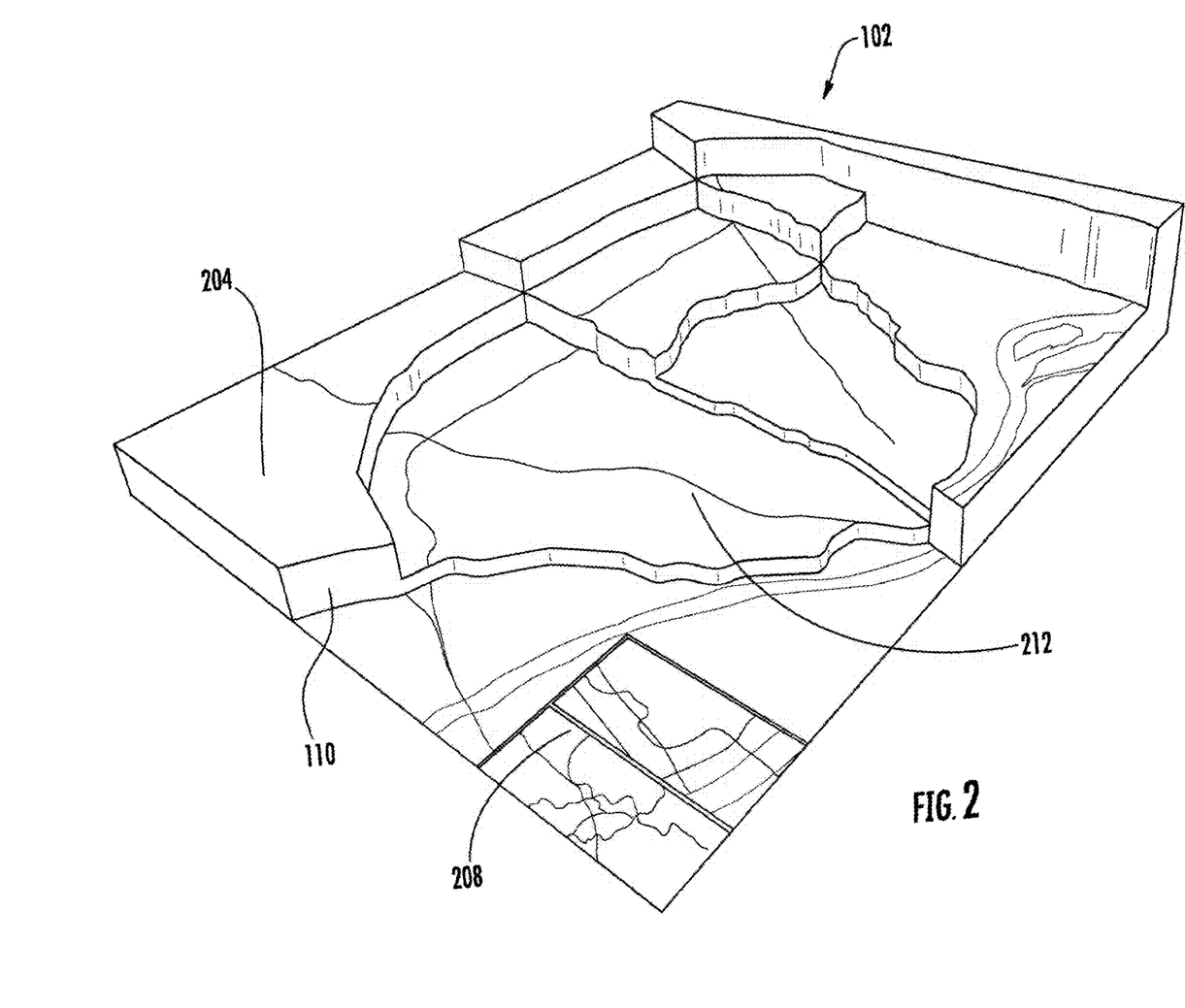
FIGS. 2 and 3 illustrate the conversion of a two-dimensional map to a three-dimensional map according to an embodiment of the disclosure.
Figure 3:
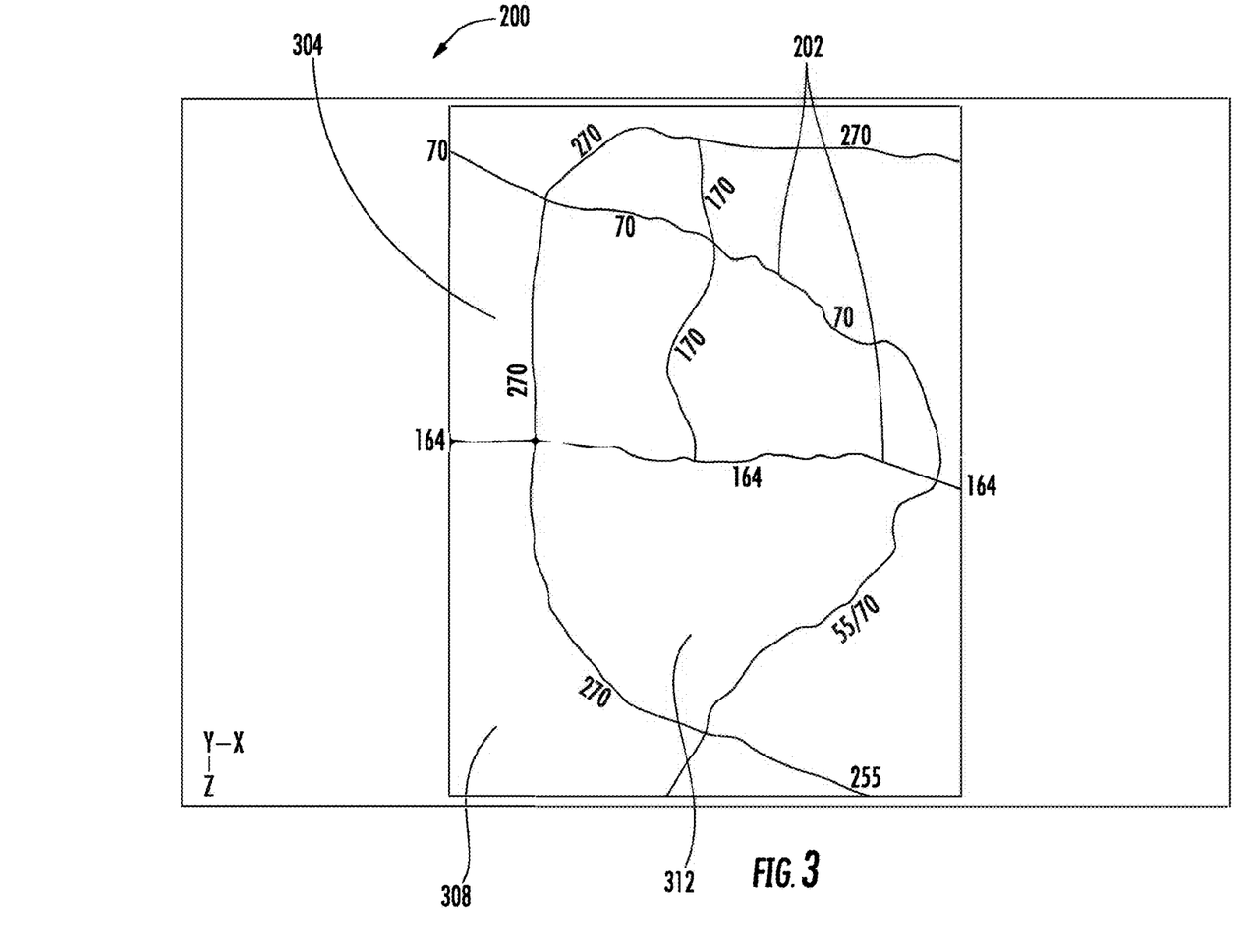

In one embodiment, an interactive three-dimensional layered map is provided on a computer. The interactive map may be presented initially on a computer display to appear as a two-dimensional map 200, as depicted in FIG. 3, such as might be presented by one or more on-line map services. The user may learn more information about a particular route by selecting the desired route on the computer, such as by clicking on the route, or selecting it from a menu of visible routes in the depicted portion of the map. When the route is selected, the displayed two-dimensional map 200 (FIG. 3) may be converted to display a three-dimensional layered map, such as depicted in FIG. 2, having a layer corresponding to the desired route, revealing the cliff face 110 that includes the points of interest along the desired route. When the user selects another route, the three-dimensional layered map displayed on the computer may display the new route layer, thus revealing the corresponding cliff face that contains the points of interest for the selected route.

The points of interest may further be comprised of hyperlinks allowing access to additional information about a particular point of interest when a user selects that point of interest, or will take a user to another screen or a website corresponding to that particular point of interest.

In some embodiments a grid is displayed on the cliff face, which provides a method of displaying more than one piece of information for a given location, by stacking the information pieces vertically within the grid on the cliff face. In this manner, an index of sorts can be created on the cliff face. In some embodiments, different textures are mapped onto the cliff face, which tends to further distinguish it from the map surfaces. In some embodiments, the cliff face can be interacted with, such as by a user with a mouse, and can be pulled up higher or expanded, thereby enabling a greater amount of information to be displayed. In some embodiments the cliff face is open, so that a portion of the map is visible through the cliff face, such as is depicted for Brainerd Road and Lee Highway in FIG. 1.

In some embodiments, lights, shadows, reflections, and projections of the cliff face are used to display portions of the cliff face that would otherwise be obscured from view behind bends in the roads that produce the cliff face. In some embodiments the cliff face is animated, and scrolls, such as in either a vertical or horizontal direction. In some embodiments the cliff face continuously displays highway web cam video. In some embodiments both directions of the web cam video is displayed, either side by side or in an over under configuration. In some embodiments the cliff face displays a Q code or other bar code, such that when scanned will display additional information on a smart phone or other device.

In some embodiments the cliff face displays coupons of businesses located along the road. In some embodiments an additional band is placed along at least one of the top or bottom of the cliff face on the surface of the map, and which band displays any of the information described herein. In some embodiments the cliff face comprises multiple cliff faces, each disposed behind the other, and a user can slide one cliff face down to display the one behind it. This can be done in a rotating mode to continuously flip through all of the available cliff faces. For example, one cliff face could have business information, another cliff face could have weather information, another cliff face could have traffic information, another cliff face could have scenic information, another cliff face could depict evacuation directions or other emergency procedures or situations, and so on.

In another embodiment the cliff face presents animation of vehicle/icon movements for an on-line map used in a social media traffic community environment, where a community of travelers is connected and communicate via a mobile application. Currently the movements and graphic representation of their vehicles are bubbles on a map. The cliff face provides a space in which to plot the movements of these vehicle icons as they move about the city and roadways. There is a space problem when the number of people/users converge on the same roadway, and the icons overlap and occlude one another. With the cliff face, there is enough space to plot a multiplicity of users/icon vehicles in traffic social media communities.

In some embodiments a cliff face is raised for the desired route between a starting point and a stopping point, with desired information for the trip displayed on the cliff face. In some embodiments the maps layers are graphics, in some they are satellite imagery, and in some they are terrestrial imagery, where the user is able to control which type of map is depicted.

In another embodiment, a three-dimensional layered map may be provided for various types of maps including transit and tourist maps. A transit map may be developed according to the present disclosure wherein the various routes of the maps are defined by transit routes. Timetables and transit fares may be placed on the cliff face between each route layer indicating the various times that transit transportation stops at each designated location along the route and the corresponding fare. A separate timetable may be placed on the cliff face at a location corresponding to a transit stop for the particular route.

Further, an interactive transit map may be provided according to the present disclosure. The interactive transit map may be configured to operate on a computer or on a mobile computing device, such as a smartphone or tablet. The interactive transit map may allow a user to select a desired transit route for traveling to a particular location. When a user selects the desired transit route, a layer is created based on that route having a cliff face including the various timetables for stops along that route. When a user desires to select an alternative transit route, the newly selected route may be shown along with the cliff face and related timetables.

The transit map including timetable information may be manually created by inputting timetables available from a local transit authority. Alternatively, the transit map may be automatically created using information available online, such as information provided on local transit websites, Google Transit, and other similar online databases.

In yet another embodiment, an interactive three-dimensional layered tourist map according to the present disclosure may be provided. The interactive tourist map may include routes of interest, such as routes that include scenic views or historical points of interest. When a user selects the desired tourist route, a layer is created based on that route having a cliff face. On the cliff face various information may be displayed such as where a particular scenic view or point of interest is located.

In one embodiment, various photos may be shown on the cliff face along the particular route on the tourist map. Various photos are publicly available online that include geographic location data. When a user selects a desired route on the interactive tourist map, publicly available photos that were taken along this route may be displayed on the cliff face of the route along with the point of interest information.

In a further embodiment, an interactive three-dimensional layered map according to the present disclosure may be used to display various roadwork information. In this embodiment, a user may select a desired route on the interactive map. Information may be displayed on a cliff face created by the desired route that includes construction dates, lane closures, and the time of day the construction will occur. This information may be either entered into the interactive map manually or the interactive map may automatically generate the information based on publicly available websites and databases providing road construction information.

In one embodiment, the interactive three-dimensional layered map may be programmed on the computer to automatically retrieve publicly available information to be displayed on the cliff face of the layered map, such as transit timetables, photos along a particular route, roadwork times, and other available information.

In one aspect of the present disclosure, a method of creating a three-dimensional layered map is provided. In one embodiment, a three-dimensional layered map may be created based on information available in a standard two-dimensional map. For example, a two-dimensional road map including point of interest information along roads on the map may be interpreted to produce a three-dimensional layered map. Desired roads from the two-dimensional map may be selected and given a desired layer height based on factors such as the frequency of traffic on each road or the number of points of interest along the road. Each road may then be divided into separate layers, with points of interest placed on the cliff face created by the vertical space between each layer of each road.

In one embodiment, a three-dimensional layered map according to one embodiment of the present disclosure may be made by manually entering information into a computer based on a standard two-dimensional map. FIG. 3 illustrates a standard two-dimensional map 200 showing various routes 202. The routes that are to be made into layers may be designated, and information corresponding to points of interest along that route may be placed on the subsequent cliff face created as part of that layer. The standard two-dimensional map 200 serves as a base map, which is used to build the multi-tiered map illustrated in FIG. 2. For example, a first surface area 304, as shown in FIG. 3, may be converted to the first layer 204 of the three-dimensional multi-tiered map 102 depicted in FIG. 2, thereby creating the first cliff face 110. Similarly, a second surface area 312 (shown in FIG. 3) may be converted to the second layer 212 of the three-dimensional multi-tiered map 102 of FIG. 2. After conversion to a three-dimensional multi-tiered map 102, a base surface area 308 (FIG. 3) corresponds to the base layer 208 illustrated in FIG. 2.

In some embodiments the map 102 is produced by and displayed on a computer, such as a standard personal computer, having a processor, memory, user input, and a display. Such a computer would be operable to produce and display the maps 102 as described herein.

In another embodiment, an interactive three-dimensional layered map may be created based on two-dimensional maps available publicly on the Internet such as those available on Google Maps. The publicly available maps may be viewed and an interactive layered map may be created including points of interest and other information available through the publicly available map database. For example, a route may be traced on the layered map and information gathered such as the number of points of interest along that route. Using the publicly available information, the height of each layer may be automatically configured depending on the number of points of interest.

The interactive three-dimensional layered map may be programmed to automatically update points of interest along a route. The interactive layered map may periodically check for updates along a route, such as if a new point of interest has been created. If the interactive layered map detects a new point of interest, that point of interest may then be automatically added to the cliff face of the layered map.

Example

Figure 4:
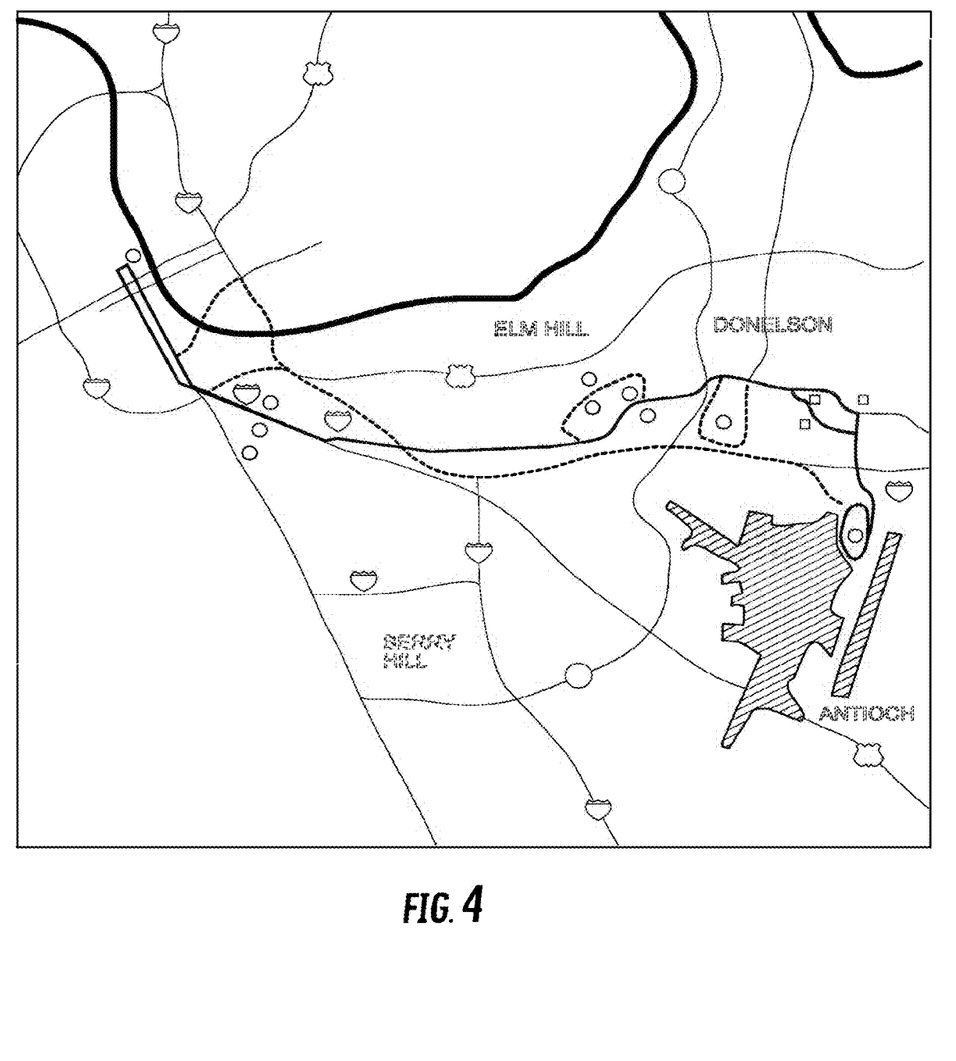
FIGS. 4 and 5 illustrate the conversion of a two-dimensional map into a three-dimensional map according to another embodiment of the disclosure.
Figure 5:
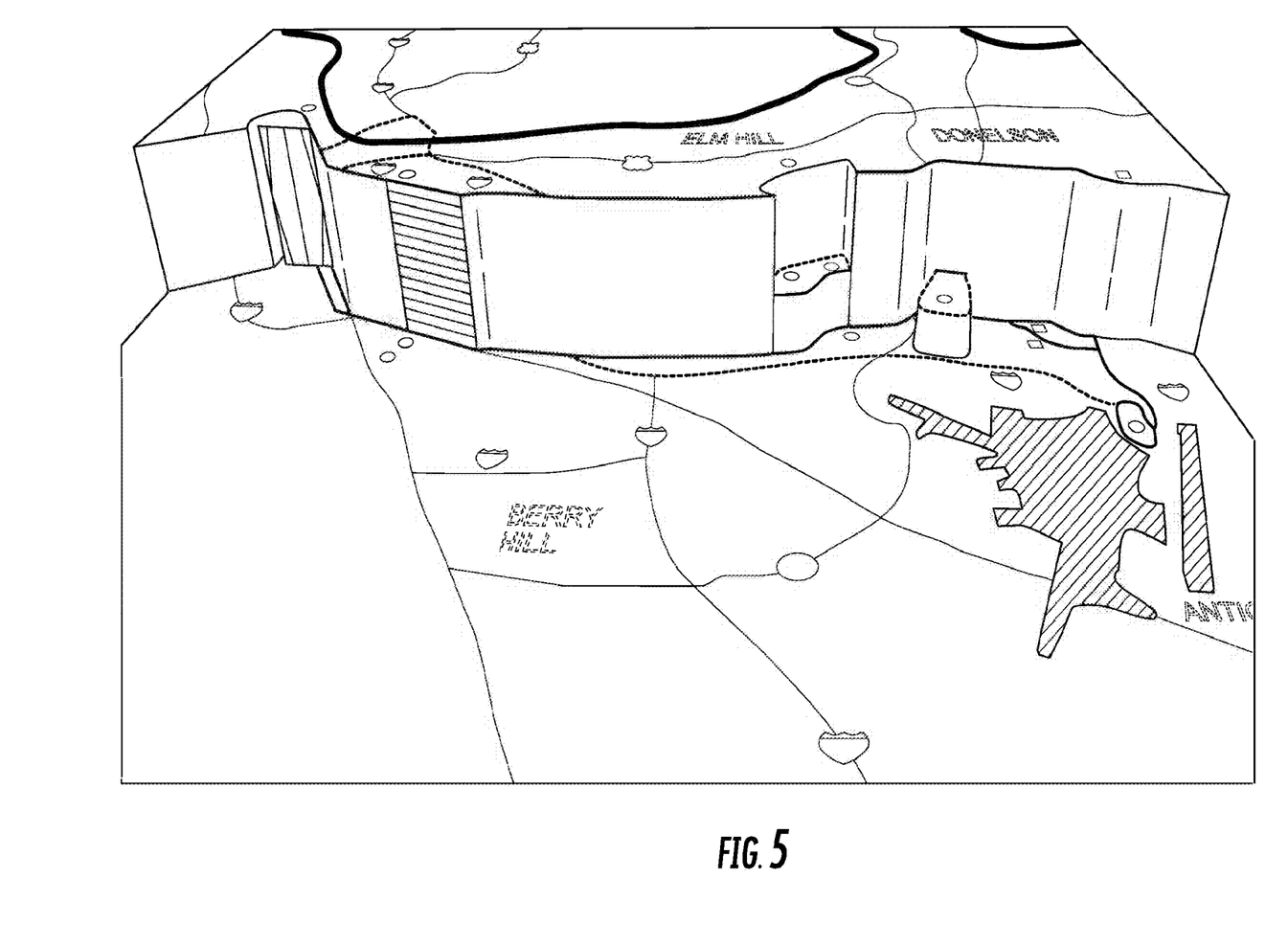

FIGS. 4 and 5 illustrate an exemplary conversion of a two-dimensional map into a three-dimensional map according to an embodiment of the present disclosure. A two-dimensional map of the Airport/Elm Hill Pike Nashville MTA bus route is shown in FIG. 4, including the bus route and stops along the route. Typically the two-dimensional map is accompanied by a timetable indicating the times that a bus stops along each stop of the bus route.

FIG. 5 is a three-dimensional map of the two-dimensional bus route map of FIG. 4 wherein a cliff face is created along the main bus route. Timetables are shown on the cliff face at the position of the stop, thereby allowing easy association of a particular timetable with a particular stop and precluding the necessity to separate the timetable schedule from individual stops.

While reference is made to a three-dimensional map that may be programmed and displayed on a computer interface, it is also understood that the three-dimensional map may be a physical model constructed of wood, plastic, metal and other similar materials. The three-dimensional map may have integrated displays for electronically displaying content. Further, a physical version of the three-dimensional map may include mechanical components that raise and lower various surface areas and cliff faces of the three-dimensional map to reveal or show content on those cliff faces.

In one embodiment, each level or tier of the three-dimensional map may operate as a support or shelf to place content or objects. For example, referring to FIG. 6, each surface area or tier of the three-dimensional map may support one or more content containers or other objects such as frames with screens in them for displaying movies, graphics, ads, and other content. The frames positioned on the tiers contain content that may be relevant to the particular area of the map or cliff face, and sits in front of the particular cliff face. The frames may include a line connecting the frame to a particular area of the three-dimensional map.

Figure 6:
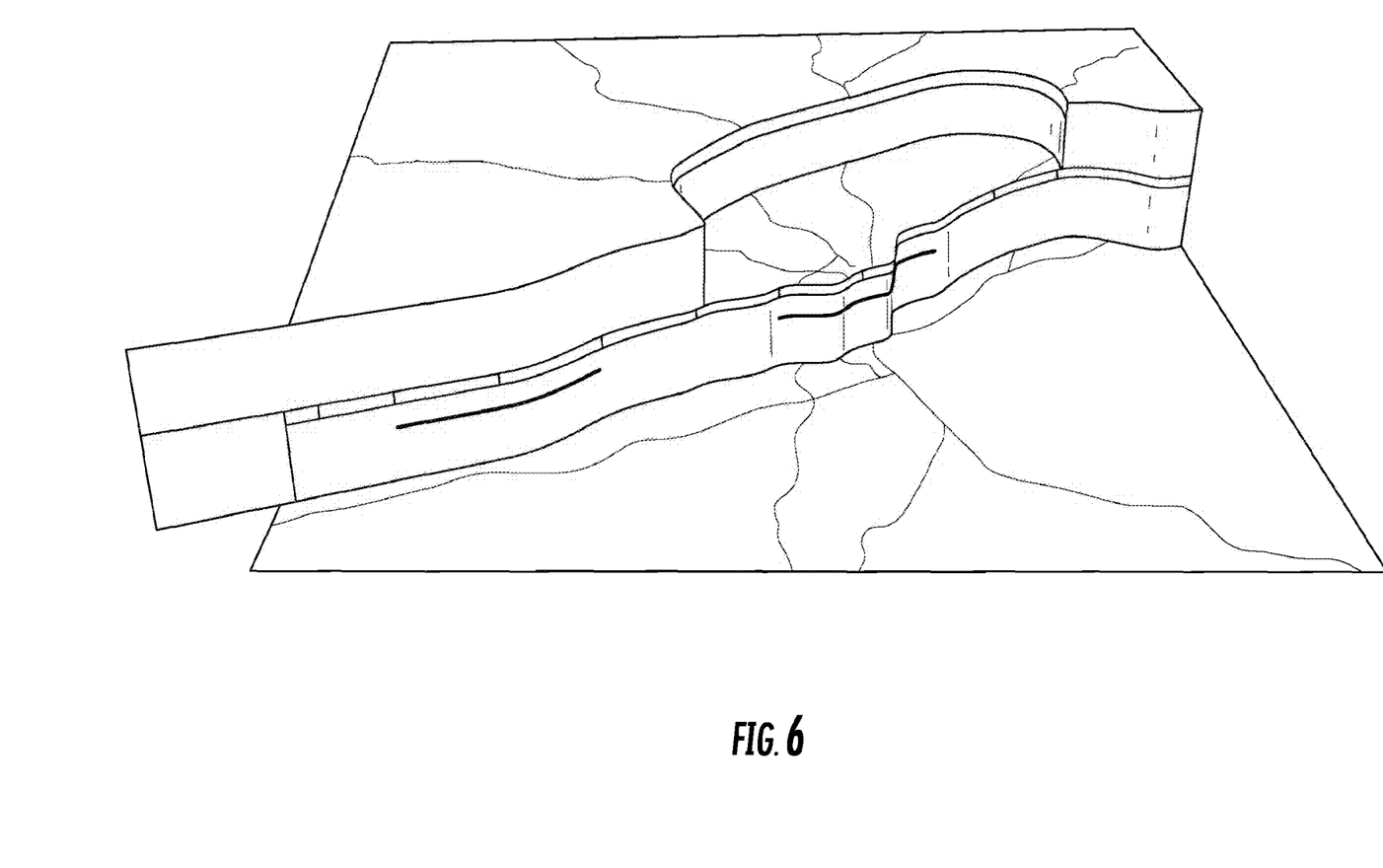
FIG. 6 is an illustration of a three-dimensional map depicting road conditions according to an embodiment of the disclosure.

The three-dimensional map may also display traffic flow information as illustrated in FIG. 6. In a traditional two-dimensional map, traffic flow information is typically overlaid over a particular route, thus obscuring any underlying information printed on the surface of the map. Using the three-dimensional map, traffic information may be displayed on the cliff face such that the traffic information does not obscure any information visible on the surface of the map. Other various information may also be printed on the cliff face along a desired route such as indicators for road work, traffic cameras, and other relevant roadway information.

The three-dimensional map cliff face may include additional features such as varying depth and thickness and may also be divided into rows and columns.

Figure 7:
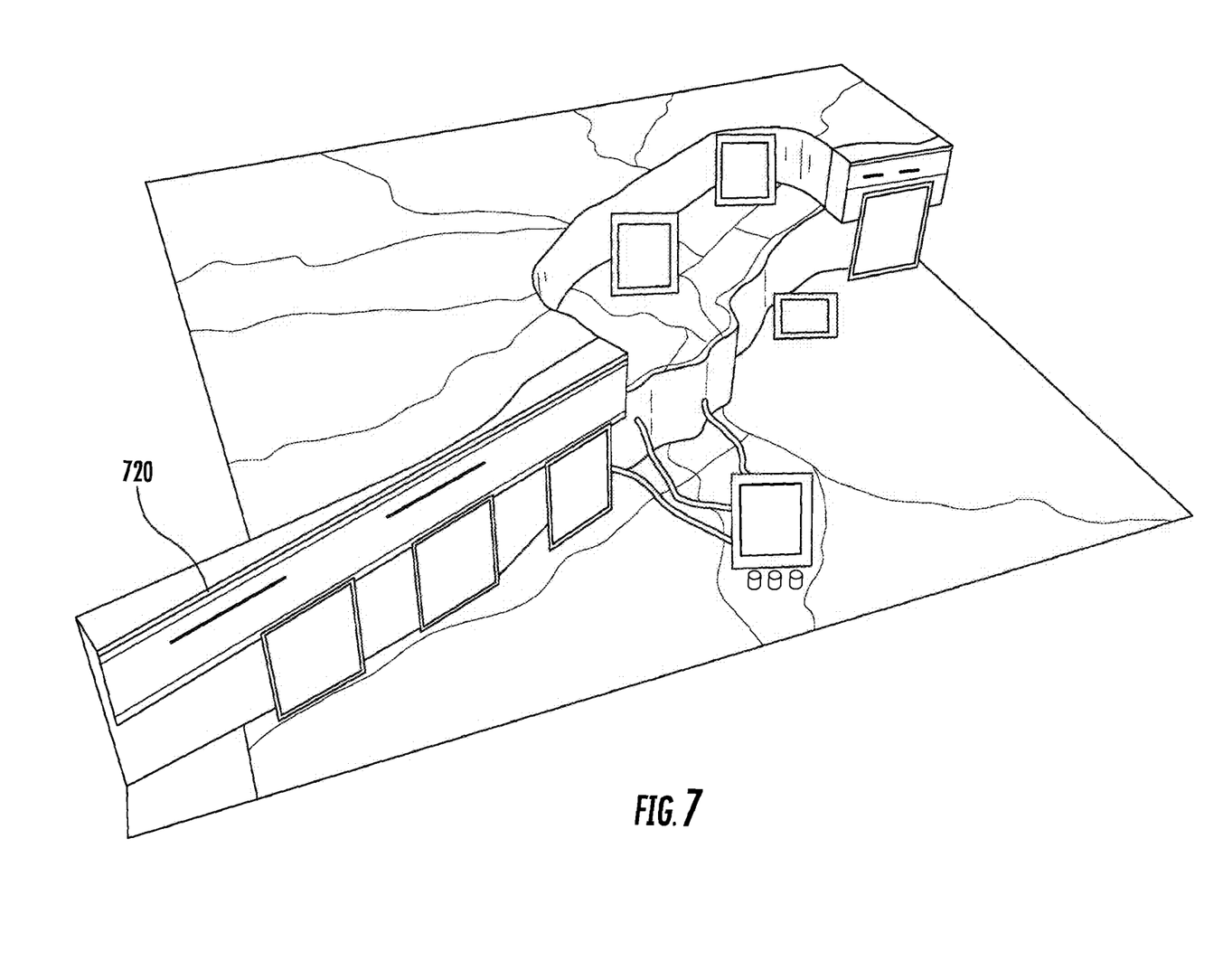
FIG. 7 is an illustration of a three-dimensional map displaying a valence according to an embodiment of the disclosure.

In one embodiment, the three-dimensional map may further include a cliff face valance 720 to provide a relatively flat surface for displaying additional content as shown in FIG. 7. Typical routes on a map are not straight and include various amounts of curvature, thus turning a cliff face following the route away from a user. By providing a cliff face valance 720 as shown in FIG. 7, parts of the cliff face are "filled in" to give a straight or optimal frontal plane on which content can be projected and shown to a user.

Figure 8:
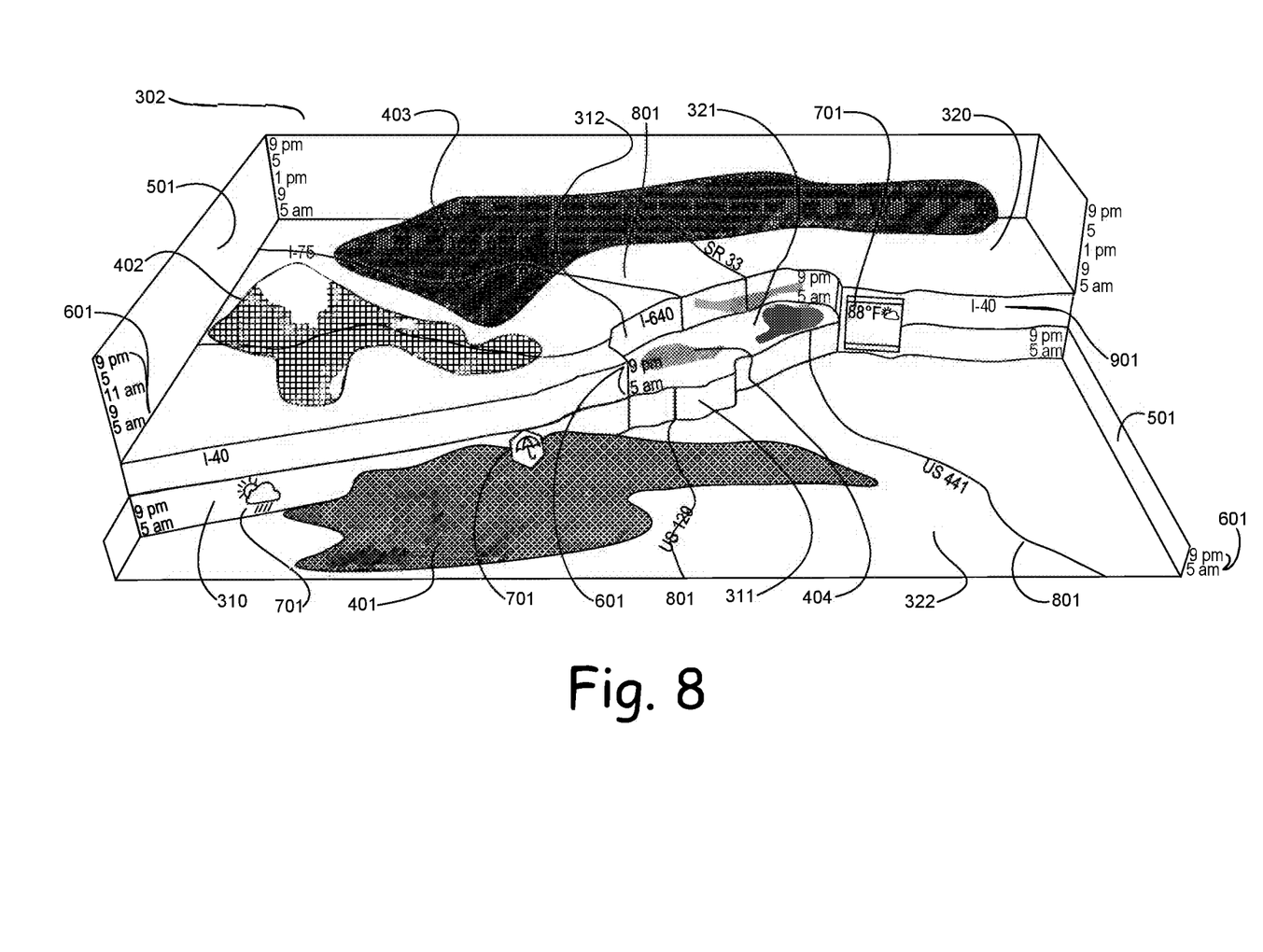
FIG. 8 is an illustration of a three-dimensional map displaying weather information according to an embodiment of the disclosure.

The three-dimensional map may also be used to display weather information as illustrated in FIG. 8. Information such as projected rainfall and other various weather information may be printed on either the surface of the three-dimensional map or one or more of the cliff faces along with other indicators such as the time corresponding to anticipated rainfall.

In various embodiments, a unique three dimensional voluminous space is formed by the boundaries of the cliff faces, in somewhat of a bowl-like space. This space is easily understood as relating to the surface and map area that is at its base. This voluminous space is used to post weather content in the manner that the changes of the radar graphics are animated over time in a vertical manner. Typically, the weather radar or Doppler maps are animated in a horizontal side to side fashion. There is always a time counter somewhere near the total weather map image that counts in hours how the radar graphic indicating rain and other participation is moving across an area.

The problem with this presentation is that the user has to keep an eye on the area they are interested in and coordinate or try to catch when and at what time the participation is over their area of interest. One embodiment keeps the graphic in the same horizontal location on the weather map as it displays the various changes in the radar graphics in a vertical manner in the clearly identified and contained three dimensional area that is formed by the boundaries of adjacent cliff faces. Also, the time changes are placed and notated on a vertical design element A vertical pole with annotations of time increments, or a graphic of progressing time points.

The benefit of animating the radar and weather changes in a vertically contained area is that it allows the viewer to keep their view and eye focused on their area of particular interest, with the time points displayed along the edges of the adjacent cliff faces. They can easily tell at what time point the participation is expected in their area of interest without having to move their eyes and try to find the counter, as in a typical map, and trying to time or synchronize their area with the time—which is always located at an extremity of the weather map.

With one embodiment the changes are displayed at in a vertical three dimensional fashion in the three dimensional voluminous area, and thus kept in the same area—the viewer's area of interest, and also the time point is displayed on the adjacent cliff faces, and thus the viewer doesn't have to look away from their focus area to find the time point. One embodiment maintains the focus area and the time points of the change in the radar system and other weather description graphics in one location, thus benefiting the viewer with a faster and more easily understood display.

The three-dimensional map may also be animated such that each of the tiers or levels of the three-dimensional map may grow or reveal themselves from the three-dimensional map, and further the map may be capable of being rotated by a user to view the map from various angles.

More on Weather Map Embodiments

The following references provide more detail in regard to FIG. 8:
  302 Three-dimensional layered map
  310, 311, 312 Roadway cliff faces
  320 Map surface area—Tier 1
    Map surface area—Tier 2
    Map surface area—Tier 3
  401,402,403,404 Weather graphics
  501 Area boundary frame, plane(s)
  601 Animation time bar(s)
  701 Weather alert icons, graphics, text—on roadways/cliff face
  801 Roadways on surface map
  901 Roadway annotation on cliff face(s)

FIG. 8 depicts an embodiment and use of displaying weather information on a three-dimensional layered map. The example of FIG. 8 depicts a three-dimensional layered map for the metro area in Knoxville, Tenn., and consists of three tiers or levels and consisting of three cliff faces 310, 311, 312.

The first tier 322 is the lowland spatial area in the foreground, which is bounded on the south by the lower extremity of the map, (b) on the east by 501 (an arbitrary structure whose purpose is to define a boundary and display pertinent annotations), (c) on the west by 501 (an arbitrary structure whose purpose is to define a boundary and display annotations), and (d) on the north by the predominant cliff faces 310 and 311, which are the I-40 roadway that completely transverses the map in an east/west direction.

The second tier 321 is an "inset" area or the "bowl" or "niche" like area, bounded (a) on the north by 312, a half-arc cliff face representing I-640, and (b) on the south by a segment of 311. The third tier 320 is the top tier or level bounded by 501, constructed structures forming sides to give definition to the space and for the display of annotations.

FIG. 8 is a representation of the weather patterns of a given area displayed in a three dimensional and layered manner. The basis of the weather map is the three-dimensional layered map design that has been previously described that consists of layers or tiers of a given map area whose boundaries are typically roadways, with the said layers being raised to different heights or levels, thus producing layers of tiers of different areas at different heights.

Of particular note is the use that the three-dimensional layered weather map makes of the three dimensional voluminous area that results from the spatial area or a base and the side, which can be another roadway raised to form another tier, or the side can be formed by an arbitrary construction to define a boundary with an adjacent cliff face. Alternately, the voluminous area can be "free standing" without any immediate structure such as the cliff face to form a boundary.

The areas can include any number of graphic elements representing different weather patterns and participation such as Doppler radar, cloud formations, rain, wind, sunshine, and so forth.

The time bar can be located anywhere along the cliff face or boundary construct, with increments arranged in a vertically oriented fashion. In this drawing the time bar is located on the extremity of the cliff face. The time bar can control or further describe an animation of the different weather graphic elements that are forecast or known to be present at any given time as represented by increments along the time bar, resulting in an animation of the weather patterns for the different areas that move in a vertical manner in synchronization with the time for that weather pattern or forecast of that weather pattern or participation.

In one embodiment the time bar changes in an animating fashion over time in a vertical fashion versus a horizontal fashion. In some embodiments a user is able click or select a specific or desired time on the time bar and the forecast of weather pattern/participation is displayed on the same vertical level as the time. In some embodiments a time point on the time bar is synchronized and displayed at the same level with the forecast weather pattern at that time.

With a typical weather map the animation is played and shown over one flat monolithic surface along with a clock that cycles thru the hours of the movement of the weather graphic elements. The weather person always says something to the effect of "this front will be moving into this area around this time." This manner of presenting the weather obscures the viewer from seeing the area that the participation is over and requires them to move their eye far away from the map in order to coordinate at what time the weather graphic is at what location. It is difficult, at best, for the viewer to try to match or pair the participation displayed with the correct time.

The benefit of the three-dimensional layered weather map is that the participation or other weather graphics are animated, along in a vertical fashion—thus not requiring the viewer to synchronize their eye movements with fast moving time display/clock that is typically displayed in a far right or left side extremity corner of the view screen or otherwise far away from the map. Displaying the participation graphics in a vertical manner that is clearly within site and bounded by the time animation bar, enables the viewer to more easily match the changing participation graphic at its appropriate time. The weather graphics and representation of time are close together; and because the areas are on different levels, the area of interest is more clearly defined and thus improves the viewers comprehension of the area of the animated weather pattern.

Animation

The three-dimensional layered map grows and expands, like an accordion laying on its side, with the divided spatial areas, animating upward to reveal or uncover the content on the cliff faces. As regards touch-screens applications/devices the user can swipe a roadway to engage the cliff face to move upward to expand the cliff face area. Once done, can return or lower the tiers/levels to a default flat non-cliff faced spatial area again.

Double Indexes

A very unique, distinct, and useful benefit comes with the three-dimensional layered map and resulting cliff faces, in that the designer has the opportunity to use the cliff face as an area for displaying another index. Indexes have traditionally been used on the extremity of a two dimensional map to locate points in the spatial area, such as alphabetical characters along the x axis, and numerals along the y axis. Points of interest and roadways can be found by lining up or following the grid coordinate. The unique benefit of the Tier Map is that we can now use the cliff face to design/display another grid that the user can find points of interest on. This use of a map with double indexes one for spatial areas and another for the cliff face has a great value and use.

Textures

The three-dimensional layered map proposes a map with different components, such as the prominent the cliff faces. This is a unique design opportunity to segregate the cliff face function and interaction with the spatial areas by the use of textures. For example, all spatial areas with a cloth texture and the cliff faces with wood and metal textures.

Light, Projections, and Reflections

We can use the simulation of light, projections and reflections to display some areas of the cliff face that can be occluded depending upon a viewing angle. But with the proper use of a graphic element such as a plane or three dimensional object that is reflective, then we can show the user the occluded area via it being a reflection in a near-by object sat in front of the occluded portion of the cliff face. Example a chrome ball judiciously placed will reflect a section of a cliff face that is occluded from the user viewpoint.

ADDITIONAL EMBODIMENTS

Other additional content may also be displayed on the cliff face of the three-dimensional map. For example, a street, such as those used in Google's Street View feature of Google Maps, may be displayed on the cliff face along a route. Under current street view systems, typically a window showing the street view is displayed in a separate frame from an overhead map view such that a user must continuously look back and forth between the two views to determine the location of the street view.

By displaying the street view on the cliff face of the three-dimensional map, a use may view both the street view and the location along a route at the same time. Further, the cliff face may show relevant advertisements for businesses located along the route so that as a user views a business on street view an advertisement is placed on the cliff face adjacent or near the street view.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A non-transitory computer-readable medium containing program instructions stored on a memory thereon that when executed by at least one processor, cause the at least one processor to perform operations comprising:
   displaying a map of a geographical area;
   dividing the geographical area into a first surface and a second surface, wherein the first surface is depicted at a first non-topographical level of the geographical area different from a second non-topographical level of the geographical area depicting the second surface;
   forming a cliff face in the geographical area between the first surface and the second surface, wherein the cliff face is displayed as a textured material indicative of a surface that is different than the first surface and the second surface; and
   disposing an information item relating to the geographical area on the textured material.

2. The non-transitory computer-readable medium of claim 1, wherein the operations further comprise:
   adjusting a shape of the textured material in response to a received interactive input.

3. The non-transitory computer-readable medium of claim 2, wherein the adjusting operation further comprises:
   expanding the cliff face in response to the interactive input to display a greater amount of information relating to a location associated with the interactive input.

4. The non-transitory computer-readable medium of claim 1, wherein the textured material includes a transparent texture.

5. The non-transitory computer-readable medium of claim 4, wherein the operations further comprise:
   displaying a portion of the geographical area through the cliff face in response to the textured material being a transparent texture, the displayed portion of the geographical area representing a region bordering the cliff face.

6. The non-transitory computer-readable medium of claim 1, wherein the operations further comprise:
   animating the map, the animating including:
      receiving a user input at a location within the map, and
      expanding and contracting a cliff face based on a location of the user input within the map.

7. The non-transitory computer-readable medium of claim 6, wherein an expansion height of the cliff face corresponds to an amount of content displayed on the cliff face.

8. The non-transitory computer-readable medium of claim 1, wherein the boundary is disposed at travel ways.

9. The non-transitory computer-readable medium of claim 8, wherein the operations further comprise:
   animating the map, the animating including portraying object movement along the travel ways.

10. The non-transitory computer-readable medium of claim 9, wherein the object is a vehicle represented by an icon.

11. The non-transitory computer-readable medium of claim 10, wherein the information item includes graphics relating to the travel ways and points of interest located along the travel ways.

12. The non-transitory computer-readable medium of claim 11, wherein the graphics include a real-time feed of at least one of text, audio, video, and animation information.

13. The non-transitory computer-readable medium of claim 12, wherein the video is of a real-time traffic condition along a travel way, the traffic condition corresponding to a location on the map where the video is displayed.

14. An apparatus comprising:
processing circuitry configured to:
    display a map of a geographical area;
    divide the geographical area into a first surface and a second surface, wherein the first surface is depicted at a first non-topographical level of the geographical area different from a second non-topographical level of the geographical area depicting the second surface;
    form a cliff face in the geographical area between the first surface and the second surface, wherein the cliff face is displayed as a textured material indicative of a surface that is different than the first surface and the second surface; and
    dispose an information item relating to the geographical area on the textured material.

15. The apparatus of claim 14, wherein the processing circuitry is further configured to:
    adjust a shape of the textured material in response to a received interactive input.

16. The apparatus of claim 15, wherein the processing circuitry is further configured to:
    expand the cliff face in response to the interactive input to display a greater amount of information relating to a location associated with the interactive input.

17. The apparatus of claim 14, wherein the textured material includes a transparent texture.

18. The apparatus of claim 17, wherein the processing circuitry is further configured to:
    display a portion of the geographical area through the cliff face in response to the textured material being a transparent texture, the displayed portion of the geographical area representing a region bordering the cliff face.

19. The apparatus of claim 14, wherein the information item includes graphics relating to the travel ways and points of interest located along the travel ways.

20. The apparatus of claim 19, wherein the graphics include a real-time feed of at least one of text, audio, video, and animation information.

* * * * *